United States Patent

[11] 3,569,994

[72] Inventor Ben W. Rau
 320 N. Deere Park West, Highland Park, Ill. 60035
[21] Appl. No. 787,099
[22] Filed Dec. 26, 1968
[45] Patented Mar. 9, 1971

[54] NAVIGATIONAL COMPUTER
 4 Claims, 3 Drawing Figs.

[52] U.S. Cl. .................................................. 235/78, 235/61
[51] Int. Cl. .................................................. G06c 27/100
[50] Field of Search ........................................ 235/61 (NAU), 61.02, 78, 88

[56] References Cited
UNITED STATES PATENTS
2,506,299 5/1950 Isom ............................. 235/61
2,775,404 12/1956 Lahr ............................. 235/61
3,231,188 1/1966 Warner ......................... 235/88X
3,350,007 10/1967 Urben ........................... 235/88

OTHER REFERENCES
" Flight Engineering and Cruise Control," Harris G. Moe, 1947, John Wiley & Sons, Inc., pp. 168-172

Primary Examiner—Richard B. Wilkinson
Assistant Examiner—Stanley A. Wal
Attorney—Dominik, Knechtel & Godula ABSTRACT: A navigational computer including a base member having arranged thereon an arcuately disposed logarithmic scale, a density altitude scale, a pressure altitude scale and an air temperature scale. A disc member of a smaller diameter than the logarithmic scale on the base member is concentrically rotatably mounted on the base member. The disc member having arranged thereon a logarithmic scale, time scales and windows disposed at predetermined positions for exposing the density altitude scale, pressure altitude scale and the air temperature scale on the base member.

INVENTOR
BEN W. RAU

INVENTOR
BEN W. RAU
BY
Dominik, Knechtel & Godula
ATTYS.

NAVIGATIONAL COMPUTER

This invention relates to an improved navigational computer.

The navigational computer of the present invention is of the type disclosed in U.S. Pat. Nos. 3,131,858 and 3,361,346. This type of computer is generally well known and is used by many pilots for solving many different types of air navigational problems. In particular, these computers are many times used to make altitude corrections and density altitude and true airspeed computations. Two operatively related pairs of air temperature and pressure altitude scales are provided on these computers, one pair of which is used to determine the true airspeed and the density altitude of an aircraft, and the other pair of which is used to determine the corrected altitude of an aircraft. These scales are positioned on a computer in a fashion such that one of the air temperature scales increases in positive values to the right of its index, and the other one of the air temperature scales increases in positive value to the left of its index. Likewise, these air temperature scales each increase in negative values in opposite directions from their indexes. This arrangement has resulted in numerous errors since the pilots using them forget and inadvertently set up the computer to solve problems as though the air temperature scales both increase or decrease in the same direction. In certain cases, for example, in making density altitude computations, such an error could result in a fatality. Also, the arrangement of scales has made it unnecessarily difficult to make true airspeed computations.

Accordingly, it is an object of the present invention to provide an improved navigational computer.

Another object is to provide an improved navigational computer arranged in a fashion such that altitude corrections and true airspeed and density altitude computations can be more easily made, with less likelihood of error.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing.

Similar reference characters refer to similar parts throughout the several views of the drawing.

Figure 1:
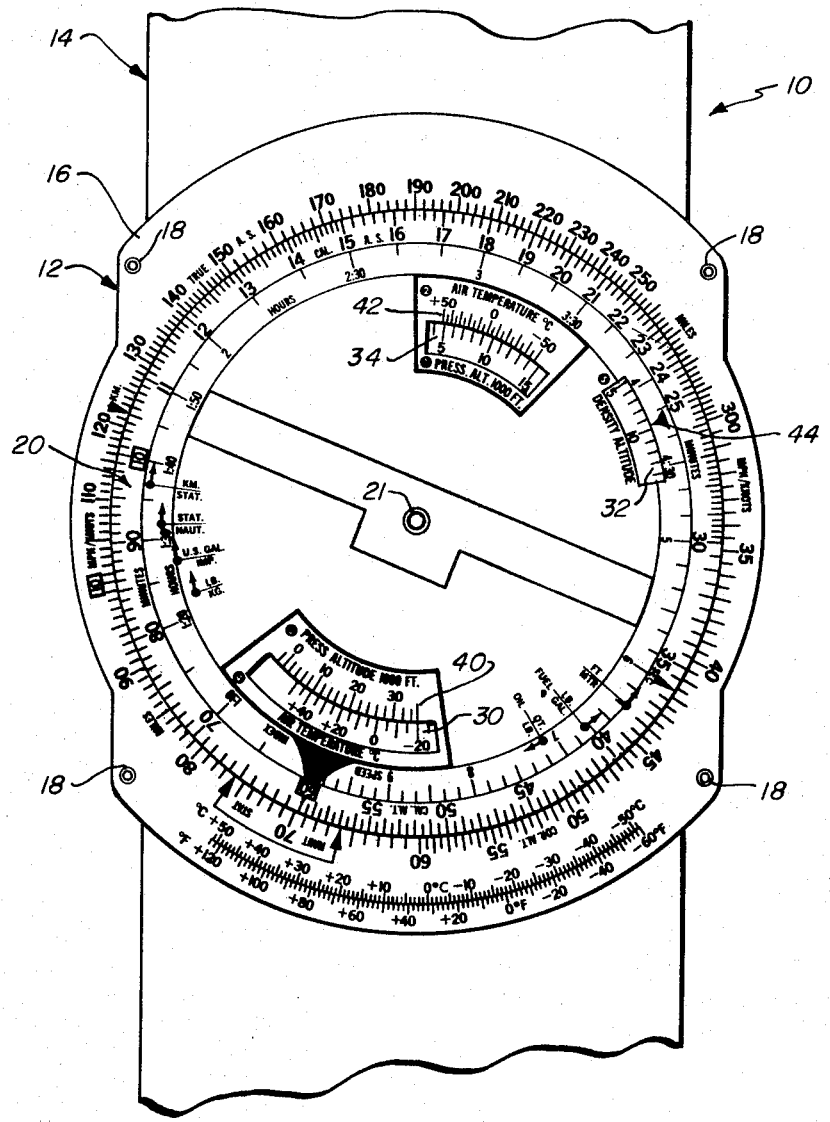
FIG. 1 is a partial plan view of a navigational computer exemplary of the present invention.

Referring now to the drawing, in FIG. 1 there is shown a navigational computer 10 which is generally like and has a construction similar to the navigational computers disclosed in the above-mentioned U.S. Pats., Nos. 3,131,858 and 3,361,346. Generally, the computer 10 includes a generally rectangular-shaped slider member 14 which is slidably received within a body portion 12 formed of two body members 16 (only one of which is shown) which are affixed together atop one another in spaced relationship by means of fastener means 18, such as rivets, threaded screws or the like. The body members 16 usually are of the same general outline which can be like that illustrated, or they can have an outline like that illustrated in U.S. Pat. No. 3,131,858. Other differently shaped outlines can be used also, if desired. The body member 16 further can be affixed together with spacers 17 between them, which spacers can be like those disclosed in U.S. Pat. No. 3,112,875, or merely with rivets in them the manner illustrated in U.S. Pat. No. 3,131,858.

The slide member 14 is imprinted with a grid of wind correction lines and speed arcs which are cooperatively related to and used with them the mechanism and indicia provided on the side opposite that shown of the computer 10. For the purpose of clarity, none of this detail is shown since it forms no part of the present invention. It is briefly described only for the purpose of indicating that the computer 10 is generally like and is used in generally the same fashion as the computers disclosed in the above-mentioned patents.

Figure 2:
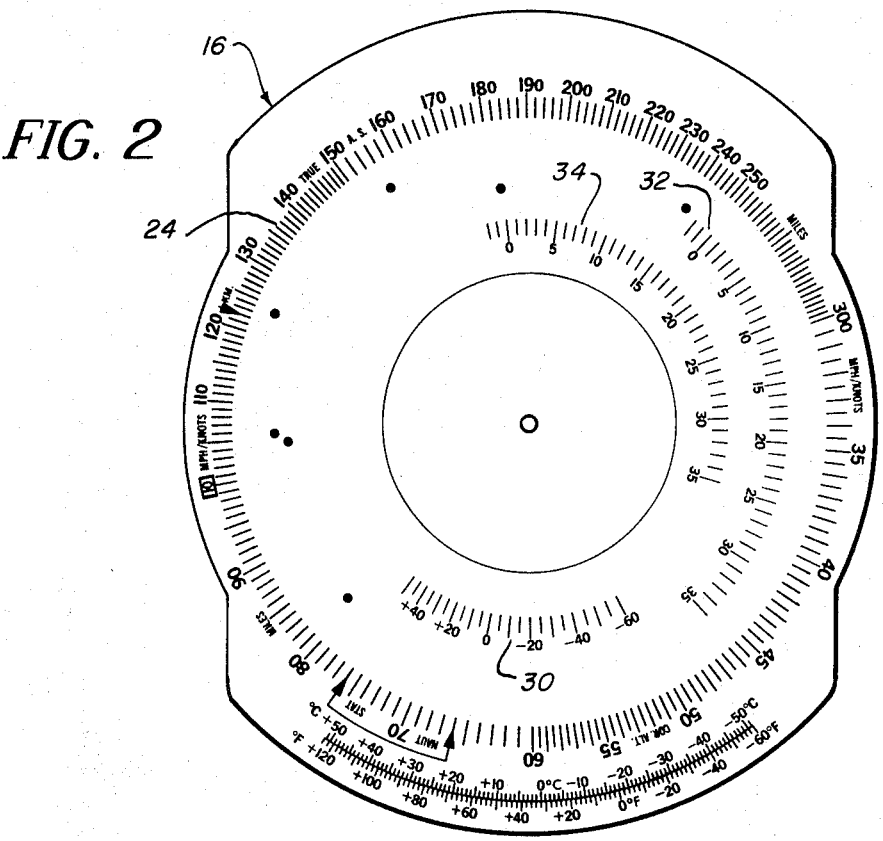
FIG. 2 is a plan view of the one body e member thereof, illustrating the scales provided on it.
Figure 3:
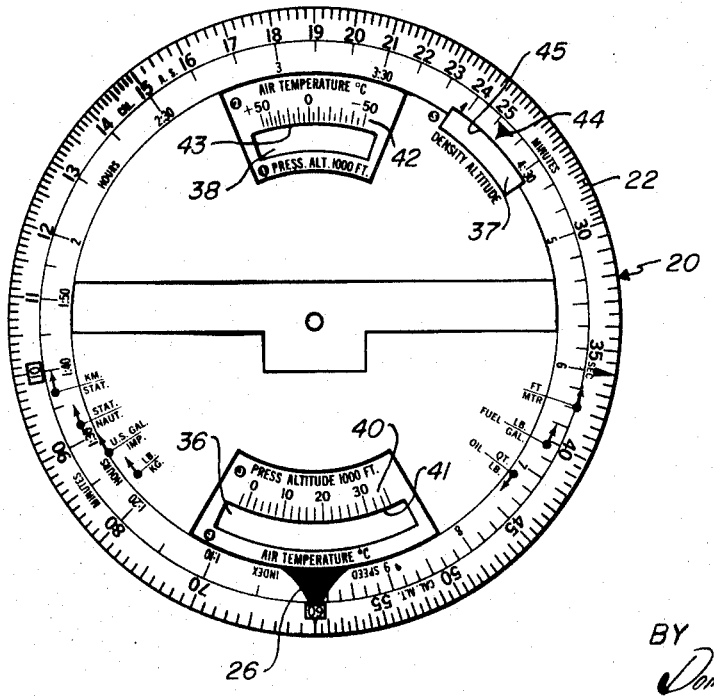
FIG. 3 is a plan view of the disc which is rotatably affixed atop the body portion of FIG. 2, to form the computer portion of the navigational computer of FIG. 1.

The body member 16, shown in FIGS. 1 and 2, has a circular shaped disc 20, which can be best seen in FIG. 3, rotatably affixed to it by means of a fastener 21 such as a grommet or the like. This disc 20 has a scale 22 adjacent its peripheral edge which is operatively related to a similar scale 24 on the body member 16. The scales 22 and 24 are alike and function in the same manner as the C- and D-scales on a conventional slide rule, the only difference being that they are calibrated to fit air navigational solutions. The C-scale 22 on the disc 20 is generally referred to as the minute scale and includes a prominent arrow 26 at 60 minutes or 1 hour. The D-scale 24 on the body member 16 is generally referred to as the miles and gallons scale. In this respect, the computer 10 also is generally like the computers disclosed in the above-mentioned patents, however, unlike the customary manner of arranging the D-scale on the body member so that the numeral 10 which functions as the index for the D-scale is positioned at a 12:00 o'clock position with respect to the longitudinal axis of the computer, the D-scale 24 is positioned so that this numeral 10 is at approximately a 9:00 o'clock position. Also, it may be noted that the numerical indicated indicia increases from 110 to 300 as you move clockwise about the D-scale from the numeral 10, and that it decreases from 90 to 35 when moving counterclockwise from the numeral 10. The reasons for and the advantages of these features will become apparent from the description below.

The body member 16 of FIGS. 1 and 2 also has an air temperature scale 30, a density altitude scale 32 and a pressure at altitude scale 34 provided on it. These scales all are generally concealed by the disc 20, and are cooperatively related to and adapted to be read through generally arcuate-shaped window 36—38 respectively, formed in the disc 20. As can be best seen in FIG. 2, the air temperature scale 30 has a 0 index and increases in value to +50 to the left of the 0 index and increases in value to —60 to the right thereof. The density altitude scale 32 and the pressure altitude scale 34 both have 0 indexes and both increase in value to 35, in a clockwise direction.

The window 36 in the disc has a pressure altitude scale 40 positioned adjacent its upper edge 41, which increases in value in a counterclockwise direction to approximately 40 and which is cooperatively related to the air temperature scale 30 on the body member 16. The window 37 has an index in the form of an arrowhead 44 which is located adjacent its upper edge 45 and is cooperatively related to the density altitude scale 32 on the body member 16. The window 38 has an air temperature scale 42 positioned adjacent its upper edge 43. This air temperature scale 42 has a 0 index and increases in value to +50 and —50 to the left and to the right of the 0 index, respectively, and is cooperatively related to the pressure altitude scale 34 on the body member 16. Appropriate indicia is provided on the disc 20, for labeling or indicating the nature of the scales on both the body member 16 and on the disc 20. It also may be noted that the arcuate-shaped windows 36—38 and the scales on the body member all are positioned in a fashion such that the windows 36 and 38 are positioned on the disc member 20 at 6:00 and 12:00, respectively, and the window 37 is at approximately 1:30 position, when the numerals 10 of the C-scale 22 and the D-scale 24 are aligned with one another. Locating these windows 36—38 in the above-described positions permits the computer 10 to be more easily used to make altitude corrections and density altitude and true airspeed computations, as explained more fully below. In addition, it may be noted that now both the air temperature scales 30 and 42 increase in positive and negative values, to the right and to the left of the 0 indexes thereof, respectively, rather than in opposite directions, as in the case of all presently available similar computers. This latter feature of prior computers, as discussed above, largely contributed to a great number of the errors which have been made in performing a large number of computations with the computers.

To illustrate the manner in which the computer 10 is used to make altitude corrections, assume an aircraft is flying at a calibrated altitude of 42,000 feet, the air temperature is −40° C. and the pressure altitude is 43,00 feet. To determine the correct altitude, the disc 20 is rotatably adjusted so that 43,000 feet pressure altitude on the pressure altitude scale 40 (in this case, the last graduation marked on the pressure altitude scale 40) is opposite the air temperature of −40° C. on the air temperature scale 30, as indicate indicated in FIG. 1. The corrected altitude of 45,000 feet is read on the D-scale 24 on the body member 16 opposite 42,000 feet which is the calibrated altitude on the C-scale 22 on the disc 20.

The manner in which the density altitude is computed also is illustrated on the computer 10, in FIG. 1. In this case, it is assumed that the air temperature is −45° C. on the air temperature scale 42 on the disc 20 is set opposite the pressure altitude of 10,000 feet on the pressure altitude scale 34 on the body member 16. The density altitude of 5,000 feet is read on the density altitude scale 32 on the body member 16 opposite the arrowhead 44 associated with the density altitude window 37.

For the purpose of illustrating the manner in which the true airspeed of an aircraft is calculated, again assume that the outside air temperature is −45° C. and that the pressure altitude is 10,000 feet. In this case, the disc 20 is rotated to align −45° C. on the air temperature scale 42 with the pressure altitude of 10,000 feet on the pressure altitude scale 34 on the body member 16, within the window 38. The true airspeed of the aircraft is read on the D-scale 24 on the body member 16 opposite the graduation corresponding to the indicated airspeed of the aircraft set on the C-scale 22 on the disc member 20. For example, assuming that the indicated airspeed of the aircraft is 200 miles per hour, it can then be seen that the true airspeed of the aircraft is 214 miles per hour.

It may be noted that in each of the corrections or computations made above, one or the other of the air temperature scales 30 and 42 is used. Furthermore, each of these computations or corrections generally are made by a pilot one or more times during a particular flight, hence it is imperative that he remember in each case to use the proper positive or negative air temperature value. Since these air temperature values increase in a positive or a negative value in the same direction on both of the air temperature scales 30 and 32, there is less likelihood for the pilot to inadvertently use the wrong air temperature value.

Most of the navigational computers 10 are used by private pilots in an aircraft which is usually flown at an airspeed within a range of 110 to 300 miles per hour. In fact, the majority of these aircrafts are usually flown at an airspeed within a range of 150 to 250 miles per hour. By arranging the C-scale 22 and the D-scale 24 on the disc 20 and on the body member 16, respectively, in the described fashion, these airspeeds at which the aircrafts are generally flown are located about the top arcuate portion of the C- and D-scale, when the computer is held as illustrated in FIG. 1. Accordingly, when the pressure altitude scale 34 and the air temperature scale 42 are used to calculate the true airspeed of an aircraft, both of these scales are as well as the C- and D-scale on the disc 20 on the body member 16 are positioned so that the pilot can easily set the computer and read the desired values. With prior computers, such as those disclosed in the above-mentioned patents, the normally used values of airspeed are in a position such that the computer must be rotatably manipulated to read these values.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

I claim:

1. A flight data computer for solving navigational problems comprising a body member having a circular disc member fixedly and rotatably secured atop it, a first arcuately disposed logarithmic scale having an index on said body member, a second arcuately disposed logarithmic scale having an index on said disc member in cooperative alignment therewith, arcuately arranged pressure altitude, density altitude and air temperature scales on said body member, said disc member having a first window having an air temperature scale associated with it, a second window having a pressure altitude scale associated with it, and a third window having an indicator marker associated with it, said first window having said air temperature scale associated with it and said second window having said indicator marker associated with it being in cooperative alignment with said pressure altitude and said density altitude scales on said body member, respectively, such that the density altitude is indicated on said density altitude scale by said indicator marker when the pressure altitude is aligned with the outside air temperature on said air temperature scale, said first and second logarithmic scales, said air temperature scale on said body member and said second window having said pressure altitude scale associated with it being arranged to indicate the corrected altitude upon aligning said first logarithmic scale aligned with the indicia corresponding to the indicated altitude of said second logarithmic scale when the indicia corresponding to the pressure altitude on said pressure altitude scale on said body member is aligned with the indicia corresponding to the outside air temperature on said air temperature scale associated with said second window, said air temperature scales on said body member and associated with said first window each having a zero index and each increasing in a positive value and in a negative value in the same direction on opposite sides of said zero index, whereby positive and negative air temperature values are read and indicated in the same direction from the index on both said air temperature scales.

2. The flight data computer of claim 1, wherein said first window and said second window are disposed diametrically opposite one another.

3. The flight data computer of claim 2, wherein the index of said second logarithmic scale is disposed in a position within a range between an 8:00 O'clock to a 9:00 O'clock position with respect to a line drawn between the diametrically opposed positions of said first and second windows, said index of said first logarithmic scale being correspondingly positioned with respect to a line drawn corresponding to the longitudinal axis of said computer, whereby the indicia on said first and second logarithmic scales increase in value from said indexes in a clockwise direction such that the airspeeds normally encountered are disposed arcuately about the line drawn corresponding to the longitudinal axis of said computer and can be read right side up in a substantially vertical position so that computed airspeed values can be read without rotatably manipulating said computer to position the indicated true airspeed right side up in a substantially vertical position to permit the same to be easily and quickly read.

4. The flight data computer of claim 3, wherein the indicia on at least said first logarithmic scale comprises numerical indicia which is calibrated and is indicated from 110 to at least 300 in increments of 10 from its index in a clockwise direction, whereby airspeeds can be directly read without converting the indicated true airspeed readings.